United States Patent
Aida

(10) Patent No.: US 9,213,511 B2
(45) Date of Patent: Dec. 15, 2015

(54) CHANGING ORDER OF PRINT JOBS IN A PRINT QUEUE

(71) Applicant: RISO KAGAKU CORPORATION, Tokyo (JP)

(72) Inventor: Yuuki Aida, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 14/494,093

(22) Filed: Sep. 23, 2014

(65) Prior Publication Data

US 2015/0085314 A1  Mar. 26, 2015

(30) Foreign Application Priority Data

Sep. 25, 2013 (JP) ................. 2013-197998

(51) Int. Cl.
*G06F 3/12* (2006.01)

(52) U.S. Cl.
CPC ............ *G06F 3/1267* (2013.01); *G06F 3/1213* (2013.01); *G06F 3/1263* (2013.01); *G06F 3/1285* (2013.01)

(58) Field of Classification Search
CPC ... G06F 3/1217; G06F 3/1267; G06F 3/1263; G06F 3/1241

USPC ........................................ 358/1.15
See application file for complete search history.

(56) References Cited

U.S. PATENT DOCUMENTS

2006/0001901 A1* 1/2006 Kidani et al. ................ 358/1.14

FOREIGN PATENT DOCUMENTS

| JP | 2008-062584 | 3/2008 |
| JP | 2009-101698 | 5/2009 |

* cited by examiner

*Primary Examiner* — Eric A Rust
(74) *Attorney, Agent, or Firm* — Hamre, Schumann, Mueller & Larson, P.C.

(57) ABSTRACT

A print job storage portion configured to store a received print job and to store its reception time and a print job execution portion configured to determine whether or not the print job stored in the print job storage portion is executable, and if the print job is inexecutable, set a printing order of the inexecutable print job to after an unprinted print job which is executable and in standby are provided, and when the print job determined to be inexecutable and in standby is changed to an executable state, a print job execution control portion rearranges the printing order of the print job changed to the executable state and the print job which is executable and in standby on the basis of their reception times and develops them into image data in a development memory and has them printed by a printing portion.

2 Claims, 9 Drawing Sheets

121

| PRINTING ORDER | PRINT JOB NAME | STATE | RECEPTION TIME | EXECUTABLE OR NOT |
|---|---|---|---|---|
| 1 | JOB A | BEING PRINTED | 10:00 | EXECUTABLE |
| 2 | JOB B | STANDBY | 10:10 | EXECUTABLE |
| 3 | JOB C | STANDBY | 10:20 | INEXECUTABLE |
| 4 | JOB D | STANDBY | 10:30 | EXECUTABLE |
| 5 | JOB E | STANDBY | 10:40 | EXECUTABLE |
| 6 | JOB F | STANDBY | 10:50 | EXECUTABLE |

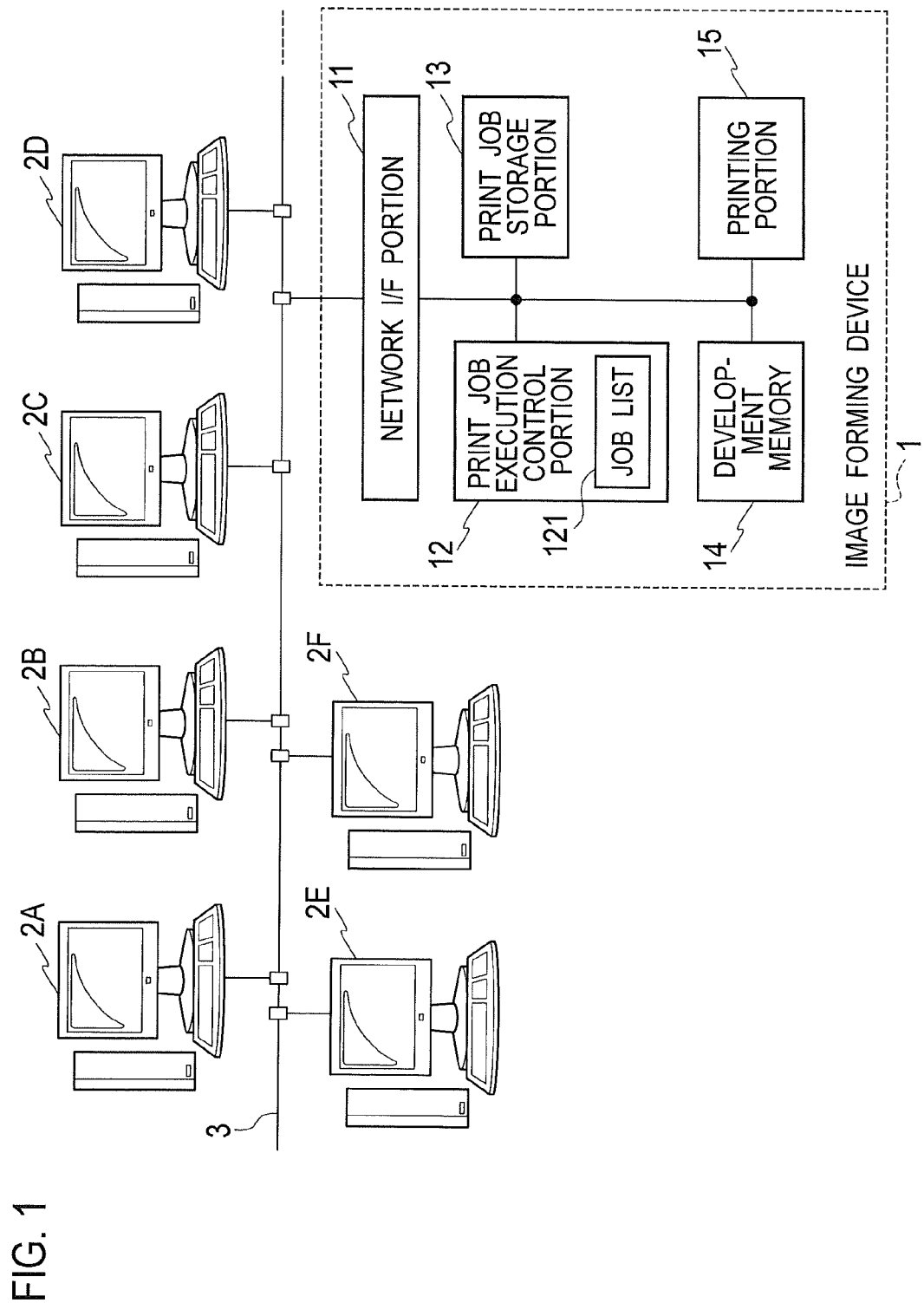

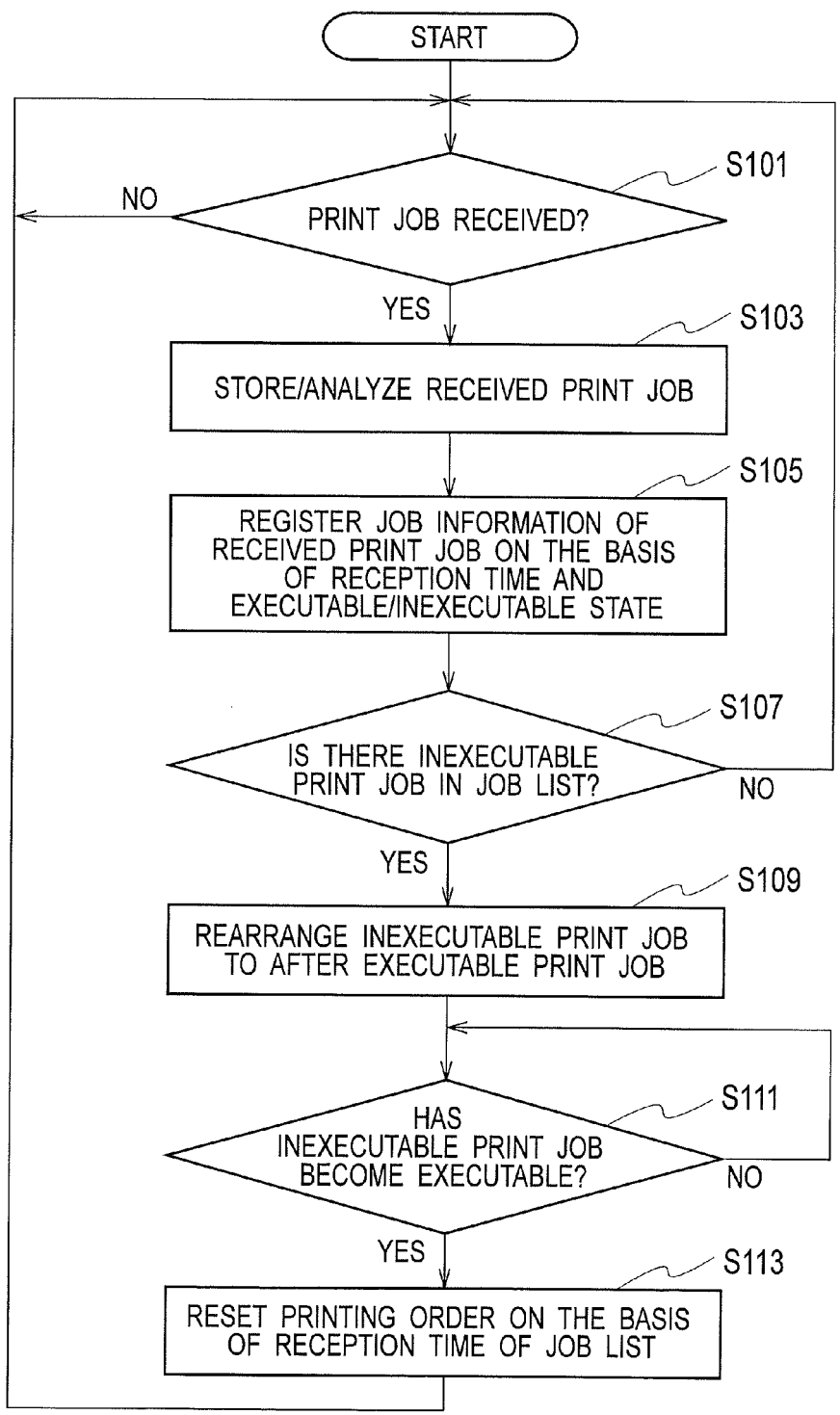

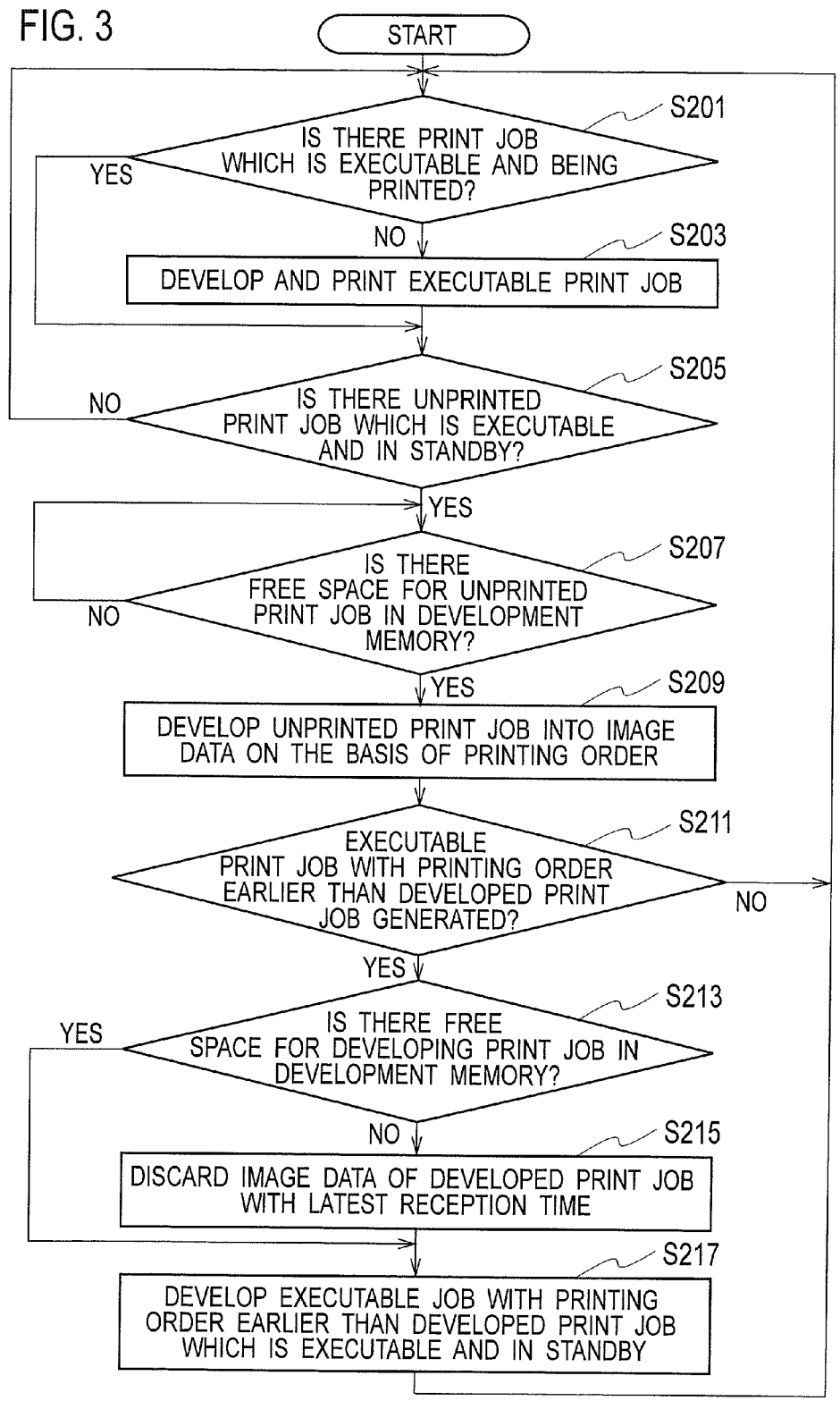

FIG. 4A  121

| PRINTING ORDER | PRINT JOB NAME | STATE | RECEPTION TIME | EXECUTABLE OR NOT |
|---|---|---|---|---|
| 1 | JOB A | BEING PRINTED | 10:00 | EXECUTABLE |
| 2 | JOB B | STANDBY | 10:10 | EXECUTABLE |
| 3 | JOB C | STANDBY | 10:20 | INEXECUTABLE |
| 4 | JOB D | STANDBY | 10:30 | EXECUTABLE |
| 5 | JOB E | STANDBY | 10:40 | EXECUTABLE |
| 6 | JOB F | STANDBY | 10:50 | EXECUTABLE |

FIG. 4B  14

| JOB A |
|---|
| JOB B |

FIG. 5A  121

| PRINTING ORDER | PRINT JOB NAME | STATE | RECEPTION TIME | EXECUTABLE OR NOT |
|---|---|---|---|---|
| 1 | JOB A | BEING PRINTED | 10:00 | EXECUTABLE |
| 2 | JOB B | STANDBY | 10:10 | EXECUTABLE |
| 3 | JOB D | STANDBY | 10:30 | EXECUTABLE |
| 4 | JOB E | STANDBY | 10:40 | EXECUTABLE |
| 5 | JOB F | STANDBY | 10:50 | EXECUTABLE |
| 6 | JOB C | STANDBY | 10:20 | INEXECUTABLE |

FIG. 5B  14

| JOB A |
|---|
| JOB B |
| JOB D |

FIG. 6A  121

| PRINTING ORDER | PRINT JOB NAME | STATE | RECEPTION TIME | EXECUTABLE OR NOT |
|---|---|---|---|---|
| 1 | JOB B | BEING PRINTED | 10:10 | EXECUTABLE |
| 2 | JOB D | STANDBY | 10:30 | EXECUTABLE |
| 3 | JOB E | STANDBY | 10:40 | EXECUTABLE |
| 4 | JOB F | STANDBY | 10:50 | EXECUTABLE |
| 5 | JOB C | STANDBY | 10:20 | INEXECUTABLE |

FIG. 6B  14

| JOB B |
|---|
| JOB D |
| JOB E |

| PRINTING ORDER | PRINT JOB NAME | STATE | RECEPTION TIME | EXECUTABLE OR NOT |
|---|---|---|---|---|
| 1 | JOB D | BEING PRINTED | 10:30 | EXECUTABLE |
| 2 | JOB E | STANDBY | 10:40 | EXECUTABLE |
| 3 | JOB F | STANDBY | 10:50 | EXECUTABLE |
| 4 | JOB C | STANDBY | 10:20 | EXECUTABLE |

| |
|---|
| JOB D |
| JOB E |
| JOB F |

| PRINTING ORDER | PRINT JOB NAME | STATE | RECEPTION TIME | EXECUTABLE OR NOT |
|---|---|---|---|---|
| 1 | JOB D | BEING PRINTED | 10:30 | EXECUTABLE |
| 2 | JOB C | STANDBY | 10:20 | EXECUTABLE |
| 3 | JOB E | STANDBY | 10:40 | EXECUTABLE |
| 4 | JOB F | STANDBY | 10:50 | EXECUTABLE |

| |
|---|
| JOB D |
| JOB C |
| JOB E |

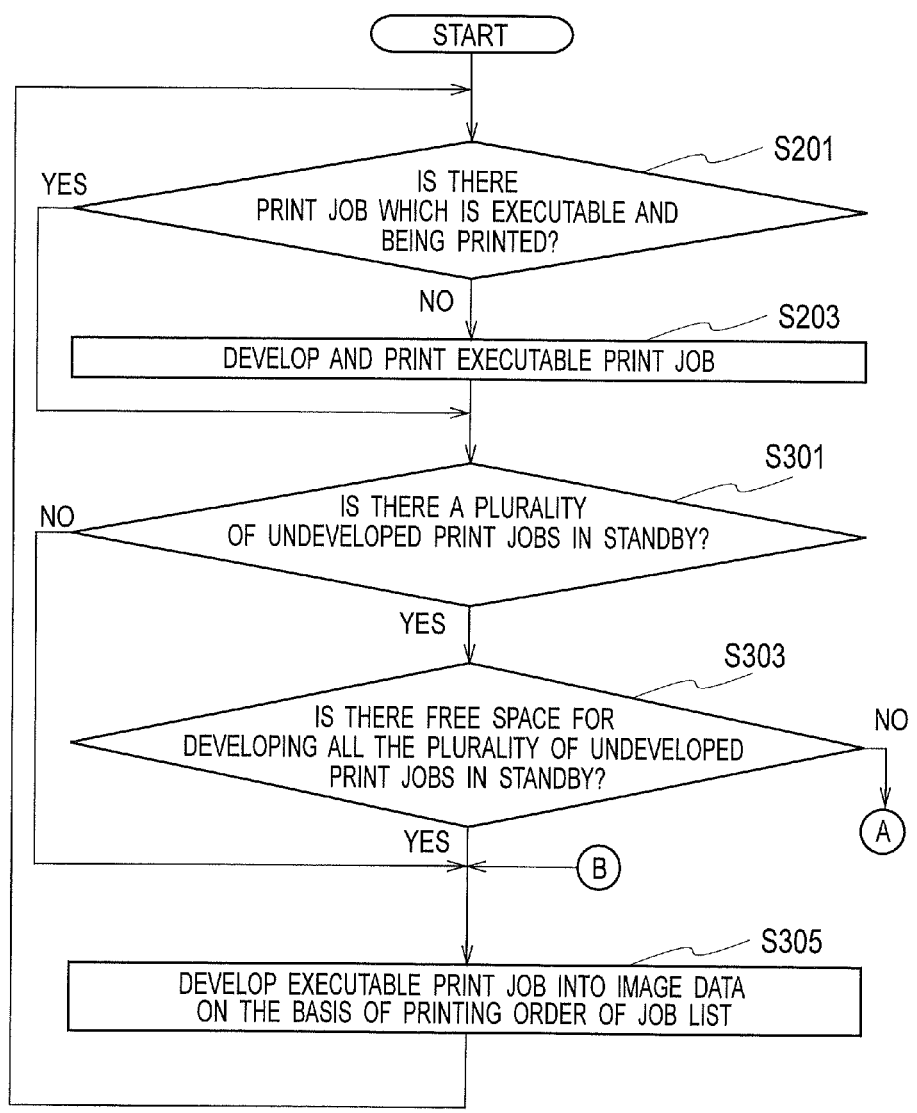

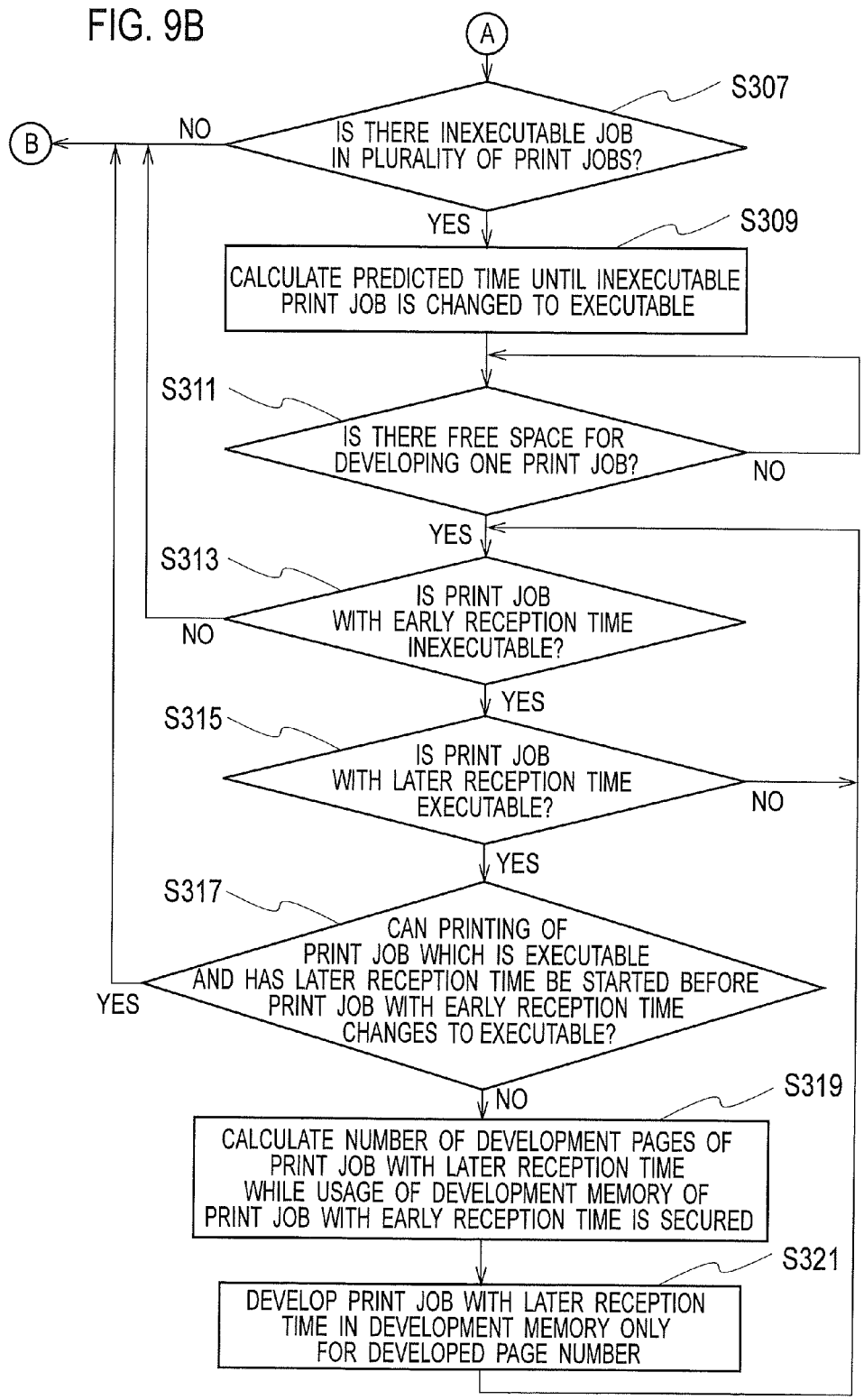

CHANGING ORDER OF PRINT JOBS IN A PRINT QUEUE

BACKGROUND

1. Technical Field

The present invention relates to an image forming device which can alleviate a sense of unfairness regarding a printing order for a user by executing a print job which was placed at a later position in the printing order since the printing was inexecutable without having to wait more than necessary.

2. Related Art

In an image forming device which receives a print job transmitted from a terminal device, develops the received print job in an development memory so as to generate image data and prints the image data, a printing order is determined on the basis of reception time of the print job and development and printing of the print job are performed as a principle.

However, in the case of a print job in which editing processing such as page fitting of image data and switching of page orders is performed, even if a first page of the image data included in the print job is received, the job is held in a state of "being inexecutable" until all the data of the print job is received and the editing processing is completed.

Thus, in order to improve productivity of the printing processing, an image forming device is proposed which determines whether or not the print job in standby is executable, and if it is inexecutable, even though its reception time is early, prints the print job in the printing order after the subsequent print job which is late in the reception time but in the executable state (see Patent Literatures 1 and 2, for example).

PRIOR ART DOCUMENT

Patent Literature

[Patent Literature 1] Japanese Patent Application Laid-Open Publication No. 2008-62584
[Patent Literature 2] Japanese Patent Application Laid-Open Publication No. 2009-101698

SUMMARY

Problems to be Solved by the Invention

In the case of the print job in which editing processing such as page fitting of image data and switching of page orders is performed, immediately after data of a part of the print job is received, the print job is in an inexecutable state and therefore the job is placed at a later position in the printing order, but after that, when all the data of the printing job have been received, the printing job enters an executable state.

However, in image forming devices described in Patent Literatures 1 and 2, even if the print job placed at a position after the subsequent print jobs in the printing order since the print job is inexecutable is changed from the inexecutable state to the executable state, the printing order is not changed, and the print job is printed after the subsequent print jobs received at later reception time.

Thus, from the viewpoint of a user of a terminal device who transmitted the print job placed at a position after the subsequent print jobs in the printing order, the printing is not executed in the order of the reception of the print jobs, and thus there is a problem that the user has a sense of unfairness regarding the printing order.

The present invention has been made in view of the above problem. An object of the present invention is to provide an image forming device which alleviates the sense of unfairness regarding the printing order by executing printing without having to wait more than necessary even if the print job placed at a position after the subsequent print job in the printing order since the print job was inexecutable is changed from the inexecutable state to the executable state.

Means for Solving the Problem

In order to achieve the above described object, one aspect of the present invention is an image forming device which receives a print job including print setting information from an outside, develops the received print job into image data in a development memory and performs printing, the image forming device including: a print job storage unit configured to store the print job and to store its reception time; and a print job execution control unit configured to perform control so as to: determine whether or not the print job is executable on the basis of the print setting information of the print job stored in the print job storage unit; set a printing order so that the print job which is executable and has an earlier reception time is printed earlier and so that a print job which is inexecutable and in a standby state comes after a print job which is executable and in a standby state on the basis of the determination result and the reception time of the print job; and develop a print job with an earlier printing order in the development memory and perform printing, wherein the print job execution control unit, when a print job determined to be inexecutable and in a standby state is changed to be executable, rearranges the printing order of the print job changed to be executable and a print job which is executable and in a standby state on the basis of their reception times.

Moreover, the image forming device according to the present invention may be characterized in that, when a print job with the printing order earlier than a print job which has been developed in the development memory and is executable and in a standby state is changed to be executable, the print job execution control unit determines whether or not there is a free space required for developing the print job in the development memory and if there is no free space in the development memory, the print job execution control unit discards image data of a print job with a later reception time among the print jobs which have been developed in the development memory and are executable and in standby and develops the print job with the earlier printing order which has been changed to be executable in the development memory.

Moreover, the image forming device according to the present invention may be characterized in that, when there is a plurality of print jobs which is in a standby state and has not been developed in the development memory, the development memory does not have a free space required for developing all the plurality of print jobs, and there is an inexecutable print job in the plurality of print jobs, the print job execution control unit: calculates a predicted time until the inexecutable print job is changed to be executable; determines whether or not printing of a print job which is executable and has a later reception time is to be started before a print job which is inexecutable and has an earlier reception time is changed to be executable on the basis of the calculated predicted time; and if the printing of the later print job is not to be started, performs control so as to develop the print job with the earlier printing order in the development memory while securing memory usage for the print job with an earlier reception time in the development memory, and to perform printing.

BRIEF DESCRIPTION OF DRAWINGS

The invention will now be described with reference to the accompanying drawings wherein:

FIG. 1 is a configuration diagram illustrating a configuration of an entire system including an image forming device of a first embodiment according to the present invention.

FIG. 2 is a flowchart illustrating an update operation of a job list in the image forming device of the first embodiment according to the present invention.

FIG. 3 is a flowchart illustrating development of a print job based on the job list into image data and a printing control operation in the image forming device of the first embodiment according to the present invention.

FIG. 4A is a diagram illustrating an example of registration contents of the job list when a print job is received from each of a plurality of terminal devices.

FIG. 4B is a diagram illustrating a developed state of the print jobs in the development memory when the print job is received from each of the plurality of terminal devices.

FIG. 5A is a diagram illustrating an example of the registration contents of the job list when a print job C in an "inexecutable" state is placed at a later position in a printing order.

FIG. 5B is a diagram illustrating a developed state of the print jobs in the development memory when the print job C in the "inexecutable" state is placed at a later position in the printing order.

FIG. 6A is a diagram illustrating an example of the registration contents of the job list when, after printing of a print job A is finished, a print job B is being printed, and the print job C is still in the inexecutable state.

FIG. 6B is a diagram illustrating a development state of the print job in the development memory when, after the printing of the print job A is finished, the print job B is being printed, and the print job C is still in the inexecutable state.

FIG. 7A is a diagram illustrating an example of the registration contents of the job list when, after printing of the print job B is finished, while a print job D is being printed, the print job C is changed to an executable state.

FIG. 7B is a diagram illustrating a development state of the print job in the development memory when, after printing of the print job B is finished, while a print job D is being printed, the print job C is changed to an executable state.

FIG. 8A is a diagram illustrating an example of the registration contents of the job list when the print job C which has been postponed is changed to the executable state and moved to before the print job E.

FIG. 8B is a diagram illustrating the development state of the print job in a development memory 14 when the print job C which has been postponed is changed to the executable state and moved to before a print job E.

FIGS. 9A and 9B are a flowchart illustrating the development into the image data based on the job list and the printing control operation in an image forming device of a second embodiment according to the present invention.

DETAILED DESCRIPTION

Figure 10:
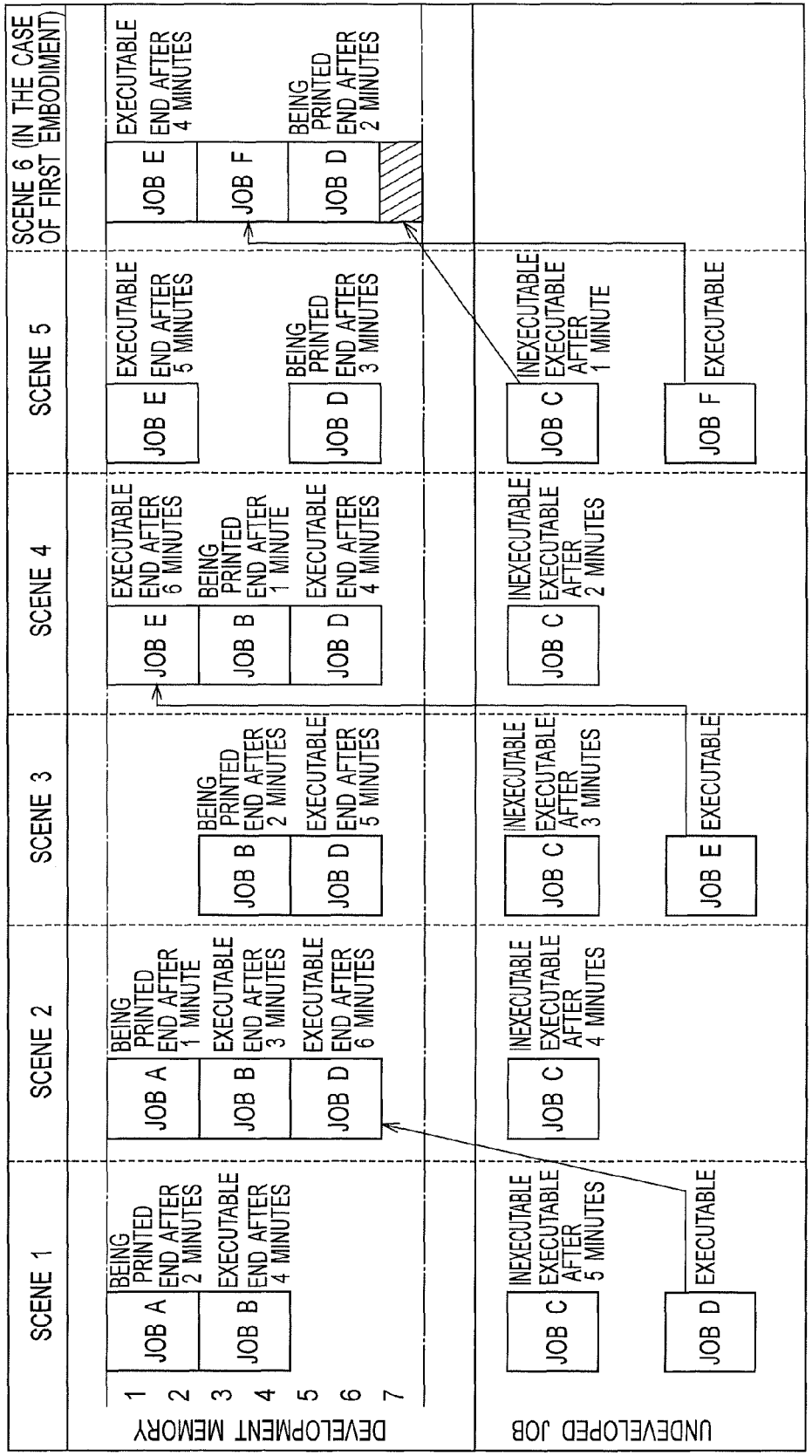
FIG. 10 is a diagram along a time series illustrating the development state of the print job in the development memory and the state of a received job which is in a standby state and has not been developed yet in the image forming device of the second embodiment according to the present invention.

The image forming device 1 of a first embodiment and a second embodiment according to the present invention will be explained below. The image forming device 1 of a first embodiment and a second embodiment explained below is an example of the image forming device according to the present invention and is capable of appropriate changes within a range of the technical idea of the present invention.

First Embodiment

The image forming device 1 of the first embodiment according to the present invention will be explained.

FIG. 1 is a configuration diagram illustrating a configuration of an entire system including the image forming device 1 of the first embodiment according to the present invention.

As illustrated in FIG. 1, the image forming device 1 of the first embodiment according to the present invention is connected to a plurality of terminal devices 2A to 2F through a wired or wireless network 3. In this embodiment, for convenience of explanation, the number of terminal devices is set to six, but not limited thereto. The image forming device 1 receives a print job transmitted by each of the terminal devices 2A to 2F, develops the received print job so as to generate image data and prints the image data.

The image forming device 1 includes a network I/F portion 11 connected to the network 3, a print job execution control portion 12 constituted by a CPU and the like, a print job storage portion 13 as a print job storage unit constituted by a RAM, a HDD and the like, a development memory 14 constituted by a RAM and the like, and a printing portion 15 executing printing.

The print job execution control portion 12 receives the print job transmitted from the terminal devices 2A to 2F and registers its job information in a job list 121 which will be described later. The print job execution control portion 12 functions as a print job execution control unit of the present invention.

That is, the print job execution control portion 12 determines whether or not the print job is executable on the basis of the print setting information of the print job stored in the print job storage portion 13, sets such that the print job which is executable and has the earlier reception time is placed at an earlier position in the printing order and also sets such that the print job which is inexecutable and in the standby state is placed at a later position after the print jobs which are executable and in the standby state in the printing order on the basis of the determination result and the reception time of the print job, and executes control such that the print job having the earlier printing order is developed in the development memory and printed. Then, the print job execution control portion 12 executes processing in which the printing order of the print jobs which are executable and in the standby state are rearranged on the basis of their reception times if the print job determined to be inexecutable and in the standby state is changed from the inexecutable state to the executable state.

That is, when the print job determined to be inexecutable among the print jobs in the standby state is changed to the executable state, the print job execution control portion 12 executes processing of rearranging the printing order of the print jobs which are executable and in the standby state on the basis of their reception times for the print jobs which are executable and in the standby state including the determined print job as targets.

In the processing in which the print job execution control portion 12 rearranges the printing order of the print jobs which are executable and in the standby state, the print job which is inexecutable and the print job being printed at the timing of the processing are not the target of rearrangement of the printing order. Thus, even if the print job execution control portion 12 executes the processing of rearranging the printing order of the print jobs which are executable and in the standby state, the printing order is held such that the print job which is present but inexecutable when the processing is to be executed is placed after the print job which is executable and in the standby state. Moreover, during the processing of rearranging the printing order of the print jobs, printing of the print job being printed is continued.

Each of the plurality of terminal devices 2A to 2F is constituted by a general-purpose personal computer or the like. Each of the plurality of terminal devices 2A to 2F transmits the print job generated in each of the terminal devices 2A to 2F to the image forming device 1 via the network 3. The transmitted print job is developed into image data in the image forming device 1 and printed.

The network 3 may be the Internet or an intranet in a company or home.

Subsequently, an operation of the image forming device 1 of the first embodiment according to the present invention will be explained by referring to the attached drawings.

FIG. 2 is a flowchart illustrating an update operation of the job list 121 in the image forming device 1 of the first embodiment according to the present invention.

As illustrated in FIG. 2, when the image forming device 1 receives the print job from the terminal devices 2A to 2F via the network 3 (Step S101), the image forming device 1 first stores the print job received by the print job execution control portion 12 in the print job storage portion 13 and also analyzes job information of the print job (Step S103) and registers the job information of the received print job in the job list 121 in the print job execution control portion 12 (Step S105).

As the job information registered in the job list 121, as illustrated in FIGS. 4A, 5A, 6A, 7A, and 8A which will be described later, information indicating the printing order indicating the order of printing in the printing portion 15, its print job name, the state, that is, if it is during printing or in standby, a reception time of the print job, and whether the print job is executable or not are registered for each of the print jobs A to F received from the terminal devices 2A to 2F, respectively.

The information indicating whether or not the print job is executable is information indicating whether the print job is "executable", that is, the print job is in a state in which the print job can be developed into the development memory 14 and can be printed immediately or "inexecutable", that is, the print job is in a state in which the print job cannot be printed. On the basis of presence of editing processing such as page fitting, page order rearrangement and the like included in the print setting information included in the print job, whether the print job is executable or not is determined, and the information indicating whether it is executable or not is registered in the job list 121. Specifically, if the editing processing is not included in the print setting information, when the print job is received, printing can be executed immediately in order from the first page and thus, the print job is set to be executable. On the other hand, if the editing processing is included in the print setting information, it is necessary that, after all the print jobs have been received, the editing processing such as page fitting, page order rearrangement and the like of document data should be executed. Thus, the print job is set to be inexecutable until the image data of all the pages are received and the editing processing such as page fitting, page order rearrangement and the like is finished.

Information indicating whether the print job is being printed or in the standby state among the job information registered in the job list 121 is changed from standby to being printed by the print job execution control portion 12 when printing of the image data corresponding to the job information is started by the printing portion 15.

The job list 121 may be stored in the print job storage portion 13, the development memory 14 or the like instead of in the print job execution control portion 12.

Subsequently, the print job execution control portion 12 refers to the job information on whether or not each print job stored in the job list 121 is executable and determines whether or not there is an inexecutable print job in the job list 121 (Step S107). If there is no inexecutable print job in the job list 121 ("NO" at Step S107), the print job execution control portion 12 moves the processing to Step S101 and repeats the processing at Step S101 and after.

On the other hand, at Step S107, if there is an inexecutable print job in the job list 121 (YES), the print job execution control portion 12 sets the printing order of the inexecutable print job to after the print job which is executable and in the standby state (Step S109). As a result, even if the inexecutable print job has earlier reception time, it is placed after the subsequent executable print job having the later reception time in the printing order, and thus, interruption of the printing operation by the inexecutable print job becomes less, and productivity of printing processing in the image forming device 1 can be improved.

Subsequently, the print job execution control portion 12 postpones the inexecutable print job to after the subsequent print job which is executable and in standby by the processing at Step S109 and then, monitors whether or not the print job in the inexecutable state is changed to the executable state (Step S111). Then, if the print job postponed and in the inexecutable state is changed to the executable state ("YES" at Step S111), the print job execution control portion 12 rearranges and sets the printing order of each of the unprinted print jobs which are executable and in standby on the basis of the job information of the reception time of each of the print jobs registered in the job list 121 (Step S113). As a result, even for the print job which was placed after the subsequent print job in the printing order since the print job was inexecutable, the printing order is reset at the time when it is changed to the executable state, and the print job is printed in the reset printing order and thus, the user's sense of unfairness regarding the printing order can be alleviated.

In FIG. 2, reception processing of the print job and registration processing of the job information illustrated at Steps S101 to S105 and resetting processing of the printing order illustrated at Steps S107 to S113 are described to be executed alternately and repeatedly, but are not necessarily limited to this example.

For example, the resetting processing of the printing order may be executed simultaneously and in parallel with the reception processing of the print job and the registration processing of the job information. However, since both the registration processing of the job information and the resetting processing of the printing order accompany an access to the job list 121, an exclusive lock needs to be employed for the access to the job list 121 so that update of the job list 121 generated in the both processing is not executed at the same time. That is, while the job list 121 is being updated in one of the processing, update of the job list 121 in the other processing needs to be prevented.

Subsequently, development into the image data and the printing control operation on the basis of the job list in the image forming device 1 of the first embodiment according to the present invention will be explained.

FIG. 3 is a flowchart illustrating the development into the image data and the printing control operation on the basis of the job list in the image forming device 1 of the first embodiment according to the present invention. The print job execution control portion 12 executes the processing illustrated in FIG. 3 simultaneously in parallel with the processing illustrated in FIG. 2.

The print job execution control portion 12 first refers to the job list 121 and determines whether or not there is a print job which is executable and being printed (Step S201). If there is no print job which is executable and being printed ("NO" at Step S201), the print job execution control portion 12 develops the executable print job into the image data in the development memory 14 and has the printing portion 15 perform printing (Step S203). If the print job has been already developed into the image data in the development memory 14 by the processing at Step S217 which will be described later, this development into the image data at Step S203 is not necessary.

On the other hand, if there is a print job which is executable and being printed in the job list 121 (YES) at Step S201, the print job execution control portion 12 skips the processing at Step S203 and determines whether or not there is an unprinted print job which is executable and in standby in the job list 121 (Step S205).

If there is no unprinted print job which is executable and in standby in the job list 121 at Step S205 (NO), the print job execution control portion 12 returns to the processing at Step S201 and executes the processing at Step S201 and after repeatedly.

On the other hand, if there is an unprinted print job which is executable and in standby in the job list 121 at Step S205 (YES), the print job execution control portion 12 subsequently determines whether or not there is a free space required for developing the unprinted print job in the development memory 14 (Step S207) and if there is no free space required for developing the unprinted print job in the development memory 14 ("NO" at Step S207), the print job execution control portion 12 stands by until the free space is secured.

On the other hand, if there is a free space required for developing the unprinted print job which is executable and in standby in the development memory 14 at Step S207, or if printing of the print job being printed is completed and the free space required for developing the unprinted print job can be secured in the development memory 14 (YES), the print job execution control portion 12 develops the unprinted print job which is executable and in standby into the image data in the development memory 14 on the basis of the printing order of the job list 121 as illustrated in FIGS. 4A, 5A, 6A, 7A, and 8A which will be described later (Step S209).

Subsequently, the print job execution control portion 12 monitors whether or not a print job which was changed from the inexecutable state to the executable state by the processing at Step S113 illustrated in FIG. 2 and has the printing order earlier (priority print job) than any of the print jobs which are executable and in standby and have been developed in the development memory 14 is generated (Step S211), and if no such print job is generated ("NO" at Step S211), the print job execution control portion 12 moves the processing to Step S201 and repeats the processing at Step S201 and after.

In the following, the print job which was changed from the inexecutable state to the executable state by the processing at Step S113 illustrated in FIG. 2 and has a printing order earlier than any of the print jobs which are executable and in standby and have been developed in the development memory 14 is referred to as the priority print job.

If the priority print job is generated ("YES" at Step S211), the print job execution control portion 12 determines whether or not there is a free space for developing the priority print job in the development memory 14 (Step S213).

If there is no free space for developing the priority print job in the development memory 14 at Step S213 (NO), the print job execution control portion 12 refers to the reception time of the job list 121 and discards the image data of the print job having the latest reception time among the print jobs which have been developed in the development memory 14 and are executable and in standby (Step S215), secures the free space in the development memory 14, and develops the priority print job (Step S217). Then, the print job execution control portion 12 moves to the processing at Step S201 and repeats the processing at Step S201 and after. If the free space which can be secured only by discarding the image data of one print job is not sufficient, that is, if the size of the free space is smaller than the size of the memory required for developing the priority print job, the image data of the print jobs are discarded in order from the print job with the later reception time, and the free space is further secured in the development memory 14. After that, the priority print job is developed in the free space.

On the other hand, if a free space for developing the priority print job remains in the development memory 14 (NO) at Step S213, the print job execution control portion 12 skips the processing at Step S215 and moves the processing to Step S217.

Subsequently, registration contents of the job list 121 and a temporal change of the development state of the print job in the development memory 14 in the image forming device 1 in the first embodiment according to the present invention will be explained in detail.

FIGS. 4A and 4B are diagrams illustrating a state in which the image forming device 1 of the first embodiment according to the present invention receives print jobs A to F from a plurality of terminal devices 2A to 2F, respectively, in which FIG. 4A is a diagram illustrating an example of the registration contents of the job list 121 and FIG. 4B is a diagram illustrating a developed state of the print jobs in the development memory 14.

As illustrated in FIG. 4A, information such as the printing order indicating the printing order in the printing portion 15, the print job name, the state indicating whether the print job is being printed or in standby, reception time of each of the print jobs A to F, and executable or not indicating whether or not the print job is in the state in which the print job can be developed in the development memory 14 and printed, for example, is registered in the job list 121 as the job information for each of the print jobs A to F received from each of the terminal devices 2A to 2F, respectively.

The print jobs include a print job in which development into the development memory 14 becomes executable immediately after data for a full page has been transmitted from each of the terminal devices 2A to 2F and received in the image forming device 1 and also a print job in which development into the development memory 14 is not made executable only by reception of the image data for a part of pages for the editing processing, such as page fitting of the image data, rearrangement of the page order and the like, and the development into the development memory 14 is made executable only after reception of the image data for all the pages.

Here, in FIGS. 4A, 5A, 6A, 7A, and 8A, contents of the job information of the job list 121 are illustrated when the image forming device 1 receives the print jobs A to F transmitted from the terminal devices 2A to 2F, respectively, for 50 minutes from 10:00 at every 10 minutes, for example.

As illustrated in FIG. 4A, in the job list 121, the printing order is set for the print jobs A to F in an order from the one having the earlier reception time on the basis of the reception time. Here, it is assumed that only the print job C received from the terminal device 2C is inexecutable, while the print jobs A, B, and D to F received from the terminal devices 2A, 2B, and 2D to 2F other than the terminal device 2C are executable. Thus, among the executable print jobs A, B, and D to F, the print job A having the earliest reception time becomes being printed by the processing at Step S203 illustrated in FIG. 3, while the other print jobs B to F are made standby.

In the development memory 14, as illustrated in FIG. 4B, only the print job A which has the first printing order and is executable and being printed and the print job B which has the second printing order and is executable and in standby are developed into the image data.

FIGS. 5A and 5B are diagrams illustrating a state in which the print jobs A to F are received from the plurality of terminal devices 2A to 2F, respectively, and the inexecutable print job C is placed at a later position in the printing order, in which FIG. 5A is a diagram illustrating an example of the registration contents of the job list 121 and FIG. 5B is a diagram illustrating the developed state of the print jobs in the development memory 14.

In the print job execution control portion 12, since only the print job C is inexecutable as illustrated in FIG. 4A, it is determined to be "YES" by the processing at Step S107 illustrated in FIG. 2, and the print job C which is inexecutable and in standby is placed after the printing orders of the executable print jobs A, B, and D to F in the printing order as illustrated in FIG. 5A by the processing at the subsequent Step S109.

Thus, the printing order of the print job C which is inexecutable and in standby becomes the sixth as illustrated in FIG. 5A. Moreover, since a free space required for developing the unprinted print job D which is executable and in standby remains in the development memory 14, the print job D whose printing order has newly set to the third as illustrated in FIG. 5B by the processing at Step S209 in FIG. 3 is developed into the image data. It is assumed that the memory capacity of the development memory 14 is limited, and the print jobs A, B, and D can be developed into the image data, but the print job E having the fourth printing order cannot be developed into the image data.

FIGS. 6A and 6B are diagrams illustrating a state in which printing of the print job A is finished, and even after printing of the print job B is started, the print job C is still inexecutable, in which FIG. 6A is a diagram illustrating an example of the registration contents of the job list 121, and FIG. 6B is a diagram illustrating the developed state of the print jobs in the development memory 14.

When printing of the print job A is finished, the print job execution control portion 12 deletes the print job A from the job list 121 as illustrated in FIG. 6A, sets the printing order of the print job B to the first, and has the printing portion 15 perform printing of the print job B. As compared with the job list 121 illustrated in FIG. 5A, in the job list 121 illustrated in FIG. 6A, the print job A is deleted, and the state of the print job B has been changed from standby to being printed.

Thus, as illustrated in FIG. 6B, the print jobs B, D, and E are developed, and the image data corresponding to the respective print jobs is stored in the development memory 14. That is, a region in the development memory 14 occupied by the image data obtained by developing the print job A is released and as a result, a free space is generated in the development memory 14, and then, the image data generated by developing the print job E is newly stored in the development memory 14.

FIGS. 7A and 7B are diagrams illustrating a state in which moreover, printing of the print job B is finished, and printing of the print job D is started and then, the print job C is changed to the executable state, in which FIG. 7A is a diagram illustrating an example of the registration contents of the job list 121 and FIG. 7B is a diagram illustrating the developed state of the print jobs in the development memory 14.

When printing of the print job B is finished, the print job B is deleted from the job list 121 as illustrated in FIG. 7A, and the printing order of the next print job D becomes the first, and the print job D is printed by the printing portion 15. As compared with the job list 121 illustrated in FIG. 6A, the print job B is deleted in the job list 121 illustrated in FIG. 7A, and the state of the print job D has been changed from standby to being printed.

Thus, as illustrated in FIG. 7B, the print jobs D, E, and F are developed, and the image data corresponding to each of the print jobs is stored in the development memory 14. That is, a region in the development memory 14 occupied by the image data obtained by developing the print job B is released and as a result, a free space is generated in the development memory 14, and then, the image data generated by developing the print job F is newly stored in the development memory 14.

Then, as explained in the flowchart in FIG. 2, the print job execution control portion 12 postpones the inexecutable print job to after the print job which is executable and in standby by the processing at Step S109 and then, monitors whether or not the print job in the inexecutable state is changed to the executable state (Step S111). If the inexecutable print job postponed to after the print job which is executable and in standby is changed to the executable state ("YES" at Step S111), the printing order of the print jobs which are executable and in standby, stored in the job list 121, is reset on the basis of their reception times (Step S113).

FIGS. 8A and 8B are diagrams illustrating a state in which the print job C postponed is changed to the executable state and moved to before the print job E on the basis of the reception time, in which FIG. 8A is a diagram illustrating an example of the registration contents of the job list 121, and FIG. 8B is a diagram illustrating the developed state of the print jobs in the development memory 14.

If the print job C postponed as illustrated in FIG. 7A is changed to the executable state, the print job execution control portion 12 resets the printing order of each of the unprinted print jobs E, F, and C which are executable and in standby, stored in the job list 121, by the processing at Step S113 in FIG. 2 on the basis of their reception times.

As a result, since the print job C has the earliest reception time among the unprinted print jobs E, F, and C which are executable and in standby, the print job C is returned to the printing order before the print jobs E and F as illustrated in FIG. 8A.

Thus, if the job list 121 is reset as illustrated in FIG. 8A, the print job F which has been developed is deleted in the development memory 14, and the print jobs D, C, and E are developed into the image data as illustrated in FIG. 8B.

This is because, since the print job execution control portion 12 determines that there is no free space enough for developing the print job C in the development memory 14 by the processing at Step S213 in FIG. 3 ("NO" at Step S213), the print job F having the latest reception time is once deleted from the development memory 14 by the processing at the subsequent Step S215 so as to secure the memory usage required for development of the print job C and then, the print job C is developed in the development memory 14 by the processing at the subsequent Step S217. As a result, even the print job C which was inexecutable and postponed to after the subsequent print jobs D, E, and F having the later reception times in the printing queue is reset to have the new printing order at the time when it is changed to the executable state and printed.

Therefore, according to the image forming device 1 of the first embodiment according to the present invention, each time the new print jobs A to F are received from the terminal devices 2A to 2F, respectively, by executing the update operation of the job list illustrated in FIG. 2, the print job execution control portion 12 places the inexecutable print job after the print job in the executable state in the printing order by the processing at Step S109, and if the inexecutable print job placed at a later position is changed to the executable state, resets the printing order in the print jobs which are executable and in standby by the processing at Step S113, and performs the development into the image data and the printing control operation illustrated in FIG. 3. That is, the printing order of the print job which is executable and in standby including the print job changed from the inexecutable state to the executable state is reset.

Thus, even if the print job which was inexecutable and placed at a later position is changed to executable, the printing order is reset on the basis of the reception time and developed into the image data, and printing is executed and thus, even the print job placed at a later position since it was in the inexecutable state is printed without having to wait more than necessary, the sense of unfairness regarding the printing order can be alleviated. Thus, the sense of unfairness regarding the printing order felt by the user of the terminal device which transmitted the print job placed at a later position since it was in the inexecutable state can be alleviated.

Particularly in the image forming device 1 of the first embodiment according to the present invention, when the print job C having the printing order earlier than the print jobs E and F which have been developed in the development memory 14 and are executable and in standby is changed to the executable state, if there is no free space required for developing the print job C changed to the executable state in the development memory 14, the image data of the print job F having the later reception time in the print jobs E and F which have been developed in the development memory 14 and in standby is discarded so as to secure the free space in the development memory 14. Thus, even the print job C which was in the inexecutable state and thus, placed after the subsequent print jobs E and F in the printing order once but changed to the executable state in the middle can be reliably developed in the development memory 14 and printed. Thus, even the print job C which was in the inexecutable state and placed after the subsequent print job in the printing order once can be reliably developed in the development memory 14 and printed without having to wait for more than necessary.

Second Embodiment

In the image forming device 1 of the first embodiment according to the present invention, if there is no free space required for developing the print job C (priority print job) which is a print job changed from the inexecutable state to the executable state and a print job having the printing order earlier than the print jobs E and F which have been developed in the development memory 14 and are executable and in standby, the image data of the print job F having the later reception time in the print jobs E and F which have been developed in the development memory 14 and are executable and in standby is discarded so as to secure the free space in the development memory 14. If the print job D being printed is finished and the free space required for developing the print job F can be secured in the development memory 14, the deleted print job F needs to be developed again.

Then, in the image forming device 1 of the second embodiment according to the present invention, regarding the print job which was in the inexecutable state and placed at a later position in the printing order, if it is changed to the executables state, the printing order of the print jobs which are executable and in standby is reset so that the print job can be developed in the development memory 14 without deleting the print job which has been developed in the development memory.

Thus, the configuration of the image forming device 1 of the second embodiment according to the present invention and the update operation of the job list illustrated in FIG. 2 are the same as those of the image forming device 1 of the first embodiment according to the present invention, and only development into the image data on the basis of the job list and the printing control operation are different. Thus, by referring to the configuration of the image forming device 1 of the first embodiment according to the present invention illustrated in FIG. 1, the development into the image data on the basis of the job list of the second embodiment according to the present invention and the printing control operation will be explained.

FIGS. 9A and 9B are a flowchart illustrating the development into the image data on the basis of the job list and the printing control operation by the print job execution control portion 12 of the image forming device 1 according to the second embodiment according to the present invention. The same processing as the processing in the image forming device 1 of the first embodiment according to the present invention illustrated in FIG. 3 are given the same step numerals.

The print job execution control portion 12 of the second embodiment according to the present invention first refers to the job list 121 and determines whether there is no print job which is executable and being printed (Step S201), and if there is no print job which is executable and being printed ("NO" at Step S201), the print job execution control portion 12 develops the executable print job into the image data in the development memory 14 and has the printing portion 15 perform printing (Step S203). If the print job has been already developed into the image data in the development memory 14 by the processing at Step S305 which will be described later, development into the image data is not necessary at this Step S203.

On the other hand, if there is a print job which is executable and being printed in the job list 121 at Step S201 (YES), the print job execution control portion 12 skips the processing at Step S203, and the print job execution control portion 12 determines whether or not there is a plurality of print jobs which is in standby and has not been developed in the development memory 14 in the job list 121 (Step S301) and also determines whether or not there is a free space for developing all the plurality of print jobs which are in standby and have not been developed in the development memory 14 (Step S303).

Here, if there is not a plurality of print jobs which is in standby and has not been developed in the job list 121 ("NO" at Step S301), the print job execution control portion 12 develops the print job from the executable print job into the image data in the development memory 14 on the basis of the printing order of the job list 121 (Step S305) and moves the processing to Step S201, and printing is executed in the processing at Step S203.

Moreover, if there is a plurality of print jobs which is in standby and has not been developed in the job list 121 ("YES" at Step S301) and if there is a free space for developing all the plurality of print jobs which are in standby and have not been developed in the development memory 14 ("YES" at Step S303), too, the print job execution control portion 12 similarly develops the print job from the executable print job into the image data in the development memory 14 on the basis of the printing order of the job list 121 (Step S305) and moves the processing to Step S201.

On the other hand, if there is a plurality of print jobs which is in standby and has not been developed in the job list 121 ("YES" at Step S301) and if there is no free space for developing all the plurality of print jobs which are in standby and have not been developed left in the development memory 14 ("NO" at Step S303), the print job execution control portion 12 further determines whether or not there is a print job in the inexecutable state in the plurality of print jobs which are in standby and have not been developed (Step S307).

If there is no inexecutable print job in the plurality of print jobs which is in standby and has not been developed at Step S307 (NO), that is, if all the plurality of print jobs in standby and having not been developed are in the executable state, the print job execution control portion 12 develops the print jobs from the executable print job into the image data in the development memory 14 (Step S305) on the basis of the printing order of the job list 121 and returns to the processing at Step S201 similarly to the instance in which the print job execution control portion 12 determines to be "NO" at Step S301 or the print job execution control portion 12 determined to be "YES" at Step S303. As a result, even if there is a plurality of print jobs which is in standby and has not been developed, when all the plurality of print jobs are in the executable state, all the plurality of print jobs which are in standby and have not been developed are developed into the image data and printed on the basis of the free space in the development memory 14 and the printing order of the job list 121.

On the other hand, if there is a print job in the inexecutable state in the plurality of print jobs which are in standby and have not been developed at Step S307 (YES), the print job execution control portion 12 first calculates a predicted time until the print job in the inexecutable state is changed to the executable state (Step S309). Here, the predicted time is calculated by using the number of print pages of the inexecutable print job, processing capacity of the print job execution control portion 12 and the like.

Subsequently, the print job execution control portion 12 determines whether or not there is a free space required for developing one of the plurality of print jobs which are in standby and have not been developed in the development memory 14 (Step S311).

At the determination at Step S311, the print job execution control portion 12 determines whether or not there is a free space in which one of the plurality of print jobs can be developed in the development memory 14 for all the plurality of print jobs which are in standby and have not been developed whether the print job is executable or inexecutable.

If it is determined that there is a free space required for developing one print job in the development memory 14 at Step S311 (YES), the print job execution control portion 12 determines whether or not the print jobs are inexecutable or executable from the print job with the earlier reception time at Steps S315, S317, S319, and S321 and sequentially develops the print jobs as determination targets in the development memory 14 in accordance with the determination results. Explanation will be made below on Steps S315, S317, S319, and S321.

The print job execution control portion 12 determines whether or not the print job with the earlier reception time is inexecutable (Step S313).

At Step S313, if the print job with the earlier reception time is executable in the plurality of print jobs which are in standby and have not been developed (NO), the print job execution control portion 12 develops the print jobs from the print job in the executable state into the image data in the development memory 14 on the basis of the printing order of the job list 121 similarly to the instance in which it is determined to be "NO" at Step S301 or it is determined to be "YES" at Step S303 (Step S305) and returns to the processing at Step S201. As a result, even if there are the plurality of print jobs which are in standby and have not been developed, the print job is developed into the image data on the basis of the printing order and printed.

On the other hand, if the print job with the earlier reception time among the plurality of print jobs which are in standby and have not been developed is inexecutable at Step S313 (YES), the print job execution control portion 12 determines whether the print job with the reception time later than the print jobs which were determination targets at Step S313 is executable (Step S315). Here, if the print job with the later reception time is also inexecutable ("NO" at Step S315), since all the print jobs which are in standby and have not been developed are inexecutable and cannot be developed in the development memory 14, the print job execution control portion 12 moves the processing to Step S313 again. That is, the print job execution control portion 12 repeats the processing at Steps S313 and S315 until at least one of the print jobs which are in standby and have not been developed is changed from the inexecutable state to the executable state.

If the print job with the later reception time is executable at Step S315 (YES), since the print job with the later reception time is executable as compared with the print job with the earlier reception time being inexecutable, the print job execution control portion 12 determines whether or not printing of the print job with the later reception time in the executable state is made capable of being started before the print job with the earlier reception time in the inexecutable state is changed to the executable state on the basis of the predicted time until the inexecutable print job is changed to the executable state, calculated by the predicted time calculation processing at Step S309, end time of the print job in the middle of the printing and the like (Step S317).

This is because, if printing of the print job with the later reception time in the executable state is made capable of being started before the print job with the earlier reception time in the inexecutable state is changed to the executable state, though execution of the print job with the later reception time is allowed, start of printing of the print job with the later reception time before the print job with the earlier reception time regardless of the change of the print job with the earlier reception time to the executable state is to be prevented. As a result, the sense of unfairness of the user of the terminal device which transmitted the print job with the earlier reception time can be alleviated.

If it is determined at Step S317 that printing of the print job in the executable state and having the later reception time can be started before the print job with the earlier reception time is changed to the executable state (YES), the print job execution control portion 12 sequentially develops the print jobs from the print job in the executable state into the image data in the development memory 14 on the basis of the printing order of the job list 121 (Step S305) and moves the processing to Step S201. In this case, before the print job with the earlier reception time is changed from the inexecutable state to the executable state, the print job in the executable state and having the later reception time is developed into the image data and printing thereof is started before the print job with the earlier reception time and thus, printing can be performed efficiently without generating waiting time in the printing portion 15.

On the other hand, if it is determined that printing of the print job in the executable state and having the later reception time cannot be started before the print job with the earlier reception time is changed to the executable state at Step S317 (NO), the print job execution control portion 12 calculates the number of development pages of the print job with the later reception time which can be developed in the remaining free space of the development memory 14 while the memory usage of the print job with the earlier reception time is secured in the development memory 14 (Step S319).

That is, the memory usage estimated to be used when the print job with the earlier reception time is developed is subtracted from the free space of the development memory 14, and the number of development pages of the print job with the later reception time which can be developed with respect to the remaining free space after the subtraction is calculated. For example, if all the print jobs with the later reception time are constituted by image data of the same size, the number of development pages is calculated by dividing the size of the remaining free space after subtraction explained above by the average size of the image data per page.

Then, the print job execution control portion 12 develops the print job with the later reception time only for the number of development pages calculated at Step S319 in the development memory 14 (Step S321) and moves the processing to Step S313. That is, in this case, while the free space to be used for development of the print job with the earlier reception time later in the processing at Step S319 is secured, the print job with the later reception time is developed in the processing at Step S321 in the development memory 14 only for the number of development pages calculated in the processing at Step S319. Then, when the print job with the earlier reception time is changed from the inexecutable state to the executable state at Step S313 ("NO" at Step S313), the print job with the earlier reception time is developed in the development memory 14 and printed prior to the print job with the later reception time in the processing at Step S305. Thus, the print job can be developed efficiently by utilizing the capacity of the development memory 14 to the maximum. The remaining undeveloped pages of the print job with the later reception time which was developed in the development memory 14 only for the number of the development pages calculated at Step S319 by the processing at Step S321 are developed by the processing at Step S305 at a stage in which printing of the print job in the middle of printing has been finished, and a free space is generated in the development memory 14.

FIG. 10 is an explanatory diagram illustrating the developed state of the print job in the development memory 14 in the image forming device 1 of the second embodiment according to the present invention and scenes 1 to 5 at every 1 minute when there is a plurality of print jobs which is in standby and has not been developed in the job list 21. A scene 6 in FIG. 10 illustrates the developed state of the print job by the image forming device 1 of the first embodiment according to the present invention.

As illustrated in FIG. 10, the developed state of the print job in the development memory 14 and the plurality of undeveloped print jobs in the development memory 14 in standby in the job list 21 are changing as illustrated in order of the scenes 1 to 5 at every 1 minute. For comparison, the scene 6 in FIG. 10 illustrates a state generated in the case of the image forming device 1 of the first embodiment.

In the scene 1, the print job A and the print job B are developed in the development memory 14, the print job A with the first (uppermost) printing order is being printed, and at that time, the inexecutable print job C and the executable print job D are in the job list 21 as the undeveloped print jobs in standby in the development memory 14.

Here, the print job execution control portion 12 expects that the print job C in the inexecutable state is to be changed to the executable state after 5 minutes by the predicted time calculation processing at Step S309. The print job A developed in the development memory 14 is being printed, and the printing is predicted to be completed after 2 minutes. Printing of the print job B is executable and is predicted to be completed after 4 minutes.

It is assumed that the development memory 14 has seven units of memory capacity, for example, as illustrated in the scene 1, and two units of the memory capacity is used for developing one print job. In the scene 1, since the two print jobs, that is, the print job A and the print job B are being developed, the development memory 14 consumes four units of the memory capacity, and it is shown that there are three units of the free space.

In the scene 2, the print job A and the print job B are developed in the development memory 14, and since the development memory 14 has three units of the free memory capacity in the scene 1, the print job D in the executable and undeveloped state is developed in the development memory 14. In the scene 2, the print job C is still in the inexecutable state and is to be changed to the executable state after 4 minutes. Moreover, in the scene 2, it is shown that there is one unit of the free capacity in the development memory 14.

In the scene 3, it is shown that printing of the print job A which was developed in the development memory 14 and has been printed is completed, and the image data of the print job A has been erased from the development memory 14. Therefore, the print jobs which are developed in the development memory 14 and are executable are only the print job B and the print job D, and it is shown that there are three units of the free capacity in the development memory 14. In this scene 3, the print job E is newly registered in the job list 121 as a print job which is executable and in standby, and the print job C is predicted to be changed to the executable state after 3 minutes.

In the scene 4, the print job B is developed in the development memory 14 and is being printed, and the print job D and the print job E in the executable state are developed. Printing of the print job B having been printed from the scene 3 is predicted to be finished after 1 minute. Printing of the print job D is predicted to be finished after 4 minutes, and printing of the print job E is predicted to be finished after 6 minutes. In this scene 4, the print job C is predicted to be changed to the executable state after 2 minutes.

In the scene 5, it is shown that printing of the print job B developed in the development memory 14 and has been printed is completed, the image data of the print job B is erased from the development memory 14, and there are three units of the free capacity in the development memory. Therefore, the print jobs which are being developed in the development memory 14 and are executable are the print job D and the print job E, and printing of them is predicted to be finished after 3 minutes and after 5 minutes, respectively. Moreover, in this scene 5, the print job F is newly registered in the job list 121 as the print job which is executable and in standby, and the print job C is predicted to be changed to the executable state after 1 minute.

In the scene 6 which comes 1 minute after the scene 5, in the case of the image forming device 1 of the first embodiment according to the present invention, the development memory 14 has three units of the free capacity, and since the print job F is in standby and executable, the print job F is developed in the development memory 14 prior to the print job C in the inexecutable state as illustrated in the scene 6 in FIG. 10. However, if the print job C is changed from the inexecutable state to the executable state after 1 minute, in order to develop the print job C in the development memory 14, the print job F with the latest reception time among the print jobs in the developed and executable state in the development memory 14 is deleted from the development memory 14.

On the other hand, in the image forming device 1 of the second embodiment according to the present invention, deletion of the print job F which has been developed in the development memory 14 is prevented by the control operation of the print job execution control portion 12 illustrated in the above-described FIGS. 9A and 9B, while the print job C is developed.

Figure 11:
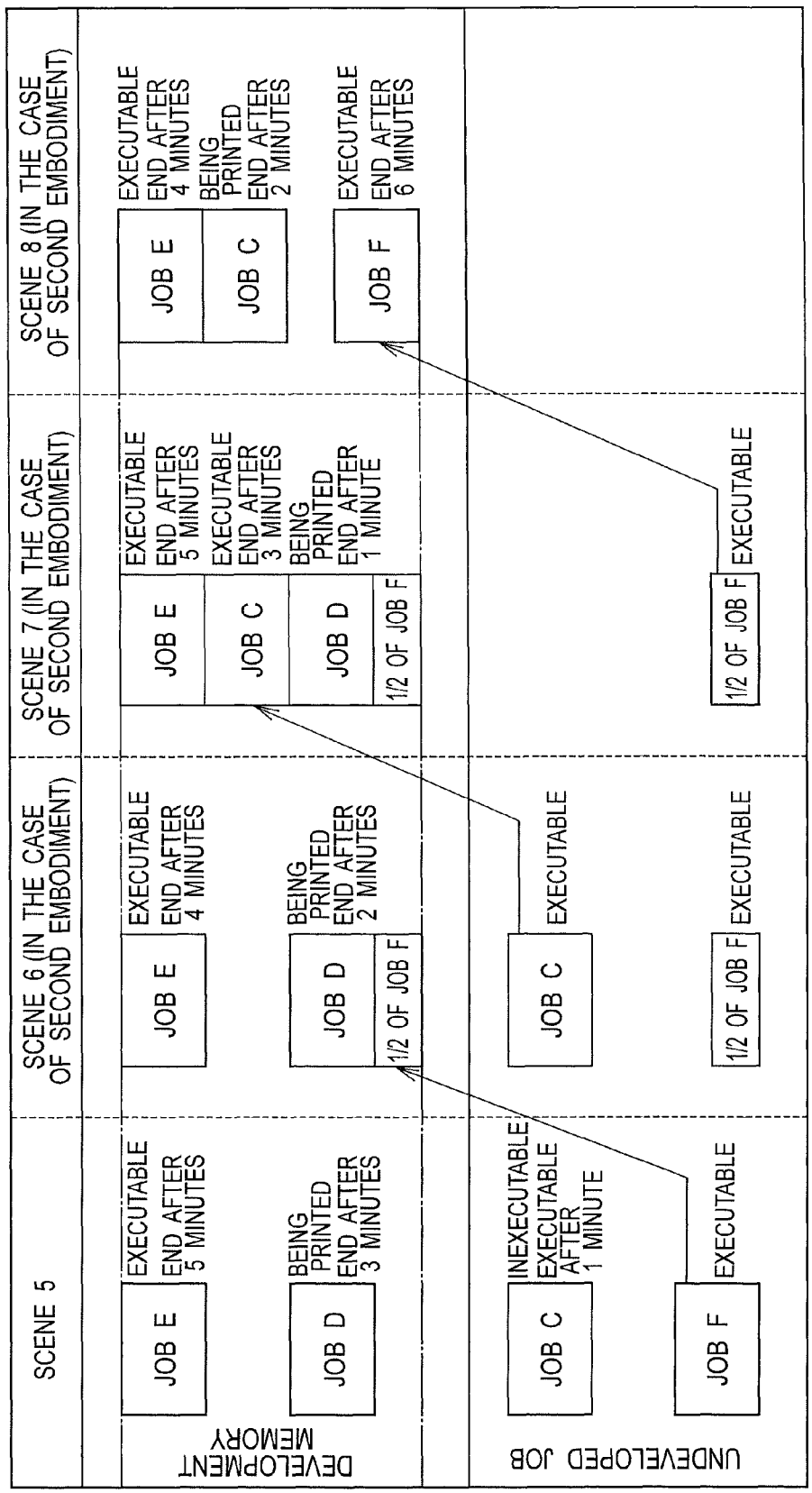
FIG. 11 is a diagram along a time series illustrating the development state of the print job in the development memory and the state of the received job which is in the standby state and has not been developed yet in the image forming device of the second embodiment according to the present invention.

FIG. 11 is a diagram illustrating a state in the development memory 14 in the scene 5 and after by the control operation of the print job execution control portion 12 of the image forming device 1 according to the second embodiment according to the present invention.

In the scene 5 illustrated in FIG. 11, similarly to the scene 5 illustrated in FIG. 10, there are two undeveloped print jobs in standby, that is, the print jobs C and F, in which only the print job F is executable, while the print job C is inexecutable, and in the development memory 14, the print jobs D and E are developed, and there are three units of the free capacity.

This is the case in which there is a plurality of undeveloped print jobs in standby in the job list 121 ("YES" at Step S301), and four units of the free capacity for developing all the plurality of undeveloped print jobs in standby are not left in the development memory 14 ("NO" at Step S303) illustrated in FIGS. 9A and 9B. Thus, the print job execution control portion 12 of the second embodiment according to the present invention determines whether or not there is a print job in the inexecutable state in the plurality of undeveloped print jobs C and F in standby in the processing at Step S307 and determines that there is the print job C in the inexecutable state ("YES" at Step S307), and the routine proceeds to the processing at Step S309.

As a result, the print job execution control portion 12 calculates the predicted time until the print job C in the inexecutable state is changed to the executable state by the processing at Step S309 and calculates that the print job will go into the executable state after 1 minute.

Subsequently, the print job execution control portion 12 determines that there is a free capacity required for developing the print job C in the development memory 14 and determines whether or not the print job C is inexecutable.

Then, in the stage of the scene 5, the print job execution control portion 12 determines that the print job C is still in the inexecutable state, and the print job F with the later reception time is in the executable state.

Then, the print job execution control portion 12 determines whether or not printing of the print job F in the executable state and with the later reception time is made capable of being started before the print job C is changed to the executable state on the basis of the predicted time until the print job C in the inexecutable state is changed to the executable state (here, it is after 1 minute as illustrated in scene 5), the end time of the print job D in the middle of printing (here, it is after 3 minutes as illustrated in scene 5) and the like.

Then, though the print job D in the middle of printing is still being printed even in the scene 6 which is 1 minute after the scene 5, it is predicted that the print job C in the inexecutable state is to be changed to the executable state, and thus, the print job execution control portion 12 determines that printing of the print job F in the executable state and with the later reception time is not made capable of being started before the print job C with the earlier reception time is changed from the inexecutable state to the executable state.

Thus, the print job execution control portion 12 calculates the number of development pages of the subsequent print job F that can be developed in the development memory 14 while the memory capacity (in this case, it is supposed to be two units) required for developing the print job C in the development memory 14 is secured. Here, as the number of development pages of the subsequent print job F, ½ of the print job F which is one unit of the development memory 14 is the number of development pages.

Subsequently, when the scene 5 proceeds to the scene 6, the print job execution control portion 12 develops the print job F with the later reception time in the development memory 14 for the calculated number of development pages (here, it is supposed to be ½ of the total page number of the print job F).

After that, when the print job C with the earlier reception time in the inexecutable state in the scene 6 is changed to the executable state, the print job C is developed into the image data by using the two units of memory capacity secured in the development memory 14 in the scene 7. In the scene 7, printing of the print job D in the middle of printing is predicted to be finished after 1 minute, and printing of the print job E in standby is predicted to be finished after 5 minutes since the print job C with the earlier reception time is to be printed first.

In the subsequent scene 8, printing of the print job D in the middle of printing is finished, the image data of the print job D is erased from the development memory 14, and the print job C in the next printing order is changed to the middle of printing. Moreover, the development memory 14 now has two units of free memory capacity, and the remaining ½ page of the total page number of the print job F having been developed into the image data only for ½ of the total page number is also developed into the image data.

As a result, in the image forming device 1 of the second embodiment according to the present invention, unlike the image forming device 1 of the first embodiment according to the present invention, the print job F developed into the image data in the development memory 14 is not deleted but is developed into the image data on the basis of the printing order of the job list 121 and can be printed.

Therefore, according to the image forming device 1 of the second embodiment according to the present invention, similarly to the image forming device 1 of the first embodiment according to the present invention, even if the execution order of the print job in the inexecutable state is postponed to after the execution order of the print job in the executable state, when the print job in the inexecutable state is changed from inexecutable to executable, the printing order is reset on the basis of the reception time of the print job and the like again. Thus, the sense of unfairness regarding the printing order of the user of the terminal device which transmitted the print job which was inexecutable and postponed in the printing queue can be alleviated Particularly in the image forming device 1 of the second embodiment according to the present invention, when the print job which was inexecutable and postponed is changed to executable, even if the printing order of the print jobs which are executable and in standby is reset so as to be developed into the image data, the print job can be developed into the image data and printed on the basis of the printing order of the job list without deleting the print job which has been developed into the development memory 14. Thus, since wasteful processing of deleting the print job which has been developed in the development memory 14 once and of developing it again is eliminated, an excess load is not applied to the print job execution control portion 12, and printing efficiency in the entire image forming device 1 can be improved.

Moreover, in the image forming device 1 of the second embodiment according to the present invention, there is a plurality of print jobs which is in standby and has not been developed in the development memory, and there is not a free space required for developing all the plurality of print jobs in the development memory. Thus, if there is a print job in the inexecutable state among the plurality of print jobs, the predicted time until the print job in the inexecutable state is changed to the executable state is calculated, and it is determined whether or not printing of the print job in the executable state and with the later reception time is started before the print job in the inexecutable state and with the earlier reception time is changed to the executable state on the basis of the calculated predicted time. If printing of the late print job is not to be started, control is made such that, while the memory usage of the print job with the earlier reception time is secured in the development memory, the print job is developed in the development memory and printed from the print job with the early printing order and thus, wasteful processing of deleting the print job which has been developed in the development memory once and of developing it again is eliminated. Thus, as compared with the image forming device 1 of the first embodiment according to the present invention, the load of processing is further reduced, and printing efficiency in the entire image forming device can be improved.

While embodiments of the present invention have been described hereinabove, these embodiments are merely illustration described for the purpose of facilitating the understanding of the present invention, and the present invention is not limited to the embodiments. The technical scope of the present invention is not limited to the specific technical matters disclosed in the embodiments but includes various modifications, changes, alternative techniques, and the like which can readily be conceived therefrom.

The present application claims for priority based on Japanese Patent Application No. 2013-197998 (filed on Sep. 25, 2013) and the entire content thereof is incorporated herein by reference.

INDUSTRIAL APPLICABILITY

According to the image forming device according to the present invention, if the print job determined to be inexecutable and in standby is changed to the executable state, a printing order of the print job changed to be executable and the print job which is executable and in standby is rearranged on the basis of their reception times, and the print job is printed after being developed into the image data. Thus, since the print job which was inexecutable and placed at a later position after the subsequent print job in the printing order is printed without having to wait for more than necessary, a sense of unfairness regarding the printing order can be alleviated.

What is claimed is:

1. An image forming device which receives a print job including print setting information via a network interface, a development memory connected to the network interface that receives the print job and develops the print job into image data, and a printer connected to the development memory that performs printing, the image forming device comprising:
a random access memory or hard disk drive data storage connected to the network interface, the random access memory or hard disk drive data storage stores the print job and stores its reception time; and
a processor connected to the network interface, the processor performs control so as to:
determine whether or not the print job is executable on the basis of the print setting information of the print job stored in the random access memory or hard disk drive data storage;
set a printing order so that the print job which is executable and has an earlier reception time is printed earlier and so that a print job which is inexecutable and in a standby state comes after a print job which is executable and in a standby state on the basis of the determination result and the reception time of the print job; and
develop a print job with an earlier printing order in the development memory and perform printing, wherein the processor, when a print job determined to be inexecutable and in a standby state is changed to be executable, rearranges the printing order of the print job changed to be executable and a print job which is executable and in a standby state on the basis of their reception times,
when a print job with the printing order earlier than a print job which has been developed in the development memory and is executable and in a standby state is changed to be executable, the processor determines whether or not there is a free space required for developing the print job in the development memory, and
if there is no free space in the development memory, the processor discards image data of a print job with a later reception time among the print jobs which have been developed in the development memory and are executable and in standby and develops the print job with the earlier printing order which has been changed to be executable in the development memory.

2. An image forming device which receives a print job including print setting information from an outside, develops the received print job into image data in a development memory and performs printing, the image forming device comprising:
a print job storage that stores the print job and stores its reception time; and
a print job execution control that performs control so as to:
determine whether or not the print job is executable on the basis of the print setting information of the print job stored in the print job storage;
set a printing order so that the print job which is executable and has an earlier reception time is printed earlier and so that a print job which is inexecutable and in a standby state comes after a print job which is executable and in a standby state on the basis of the determination result and the reception time of the print job; and
develop a print job with an earlier printing order in the development memory and perform printing, wherein the print job execution control, when a print job determined to be inexecutable and in a standby state is changed to be executable, rearranges the printing order of the print job changed to be executable and a print job which is executable and in a standby state on the basis of their reception times,
when there are a plurality of print jobs which are in a standby state and have not been developed in the development memory, the development memory does not have a free space required for developing all the plurality of print jobs, and there is an inexecutable print job in the plurality of print jobs, the print job execution control:
- calculates a predicted time until the inexecutable print job is changed to be executable;
- determines whether or not printing of a print job which is executable and has a later reception time is to be started before a print job which is inexecutable and has an earlier reception time is changed to be executable on the basis of the calculated predicted time; and
- if the printing of the later print job is not to be started, performs control so as to develop the print job with the earlier printing order in the development memory while securing memory usage for the print job with an earlier reception time in the development memory, and to perform printing.

* * * * *